S. A. HOGE.
VEHICLE WHEEL.
APPLICATION FILED JAN. 3, 1919.

1,370,444.

Patented Mar. 1, 1921.

Witnesses:

Inventor:

UNITED STATES PATENT OFFICE.

SMITH A. HOGE, OF RICES LANDING, PENNSYLVANIA.

VEHICLE-WHEEL.

1,370,444.

Specification of Letters Patent.

Patented Mar. 1, 1921.

Application filed January 3, 1919. Serial No. 269,410.

*To all whom it may concern:*

Be it known that I, SMITH A. HOGE, a citizen of the United States, residing at Rices Landing, in the county of Greene and State of Pennsylvania, have invented certain new and useful Improvements in Vehicle-Wheels, of which the following is a specification.

My invention consists of an improvement in vehicle wheels, and has for its object to provide, in a wheel of such type, resilient means for absorbing the shocks of impact and the various strains incident to vehicle wheels by means of a continuous annularly arranged spiral spring. Such spring is arranged annularly within the tire portion, and is connected with the hub by intervening spokes, adapting the wheel to operation either for support or traction in the manner more fully hereinafter described.

In the drawings which illustrate one preferred adaptation of the invention;

Figure 1:
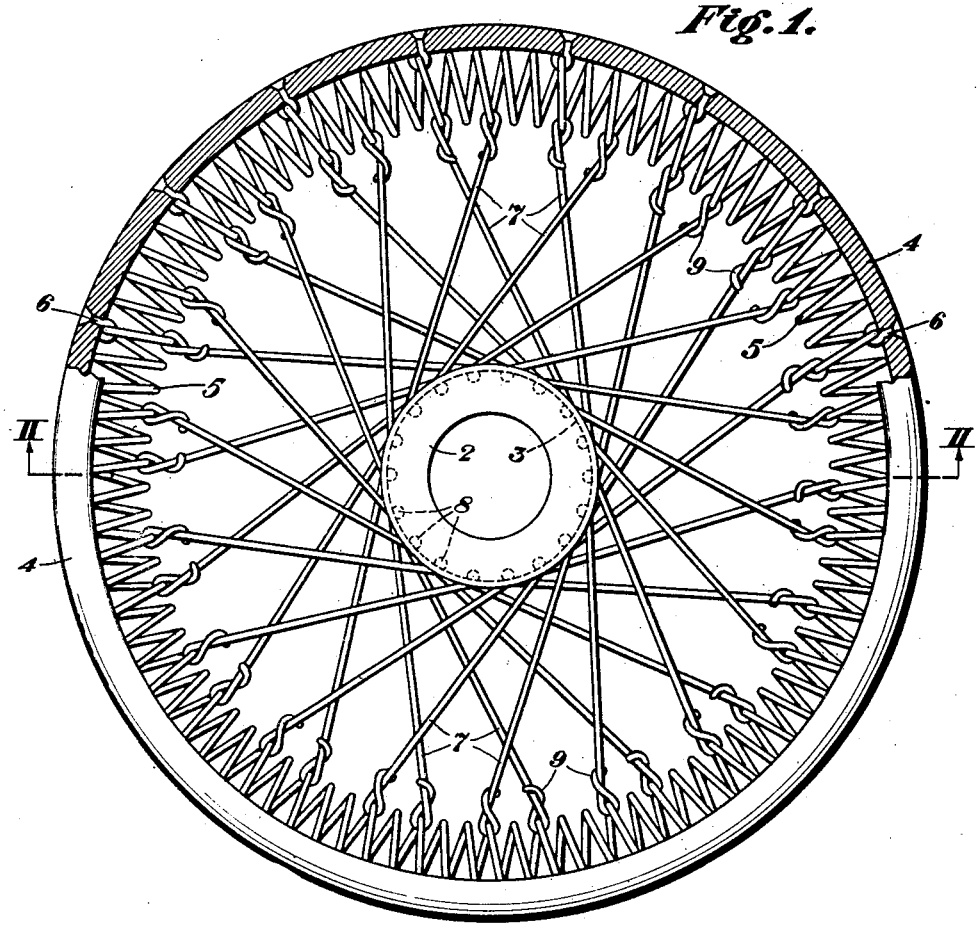
Figure 1 is a view in elevation partly in section of a wheel provided with an annular spiral spring and an outer shoe connected directly with the hub.
Figure 2:
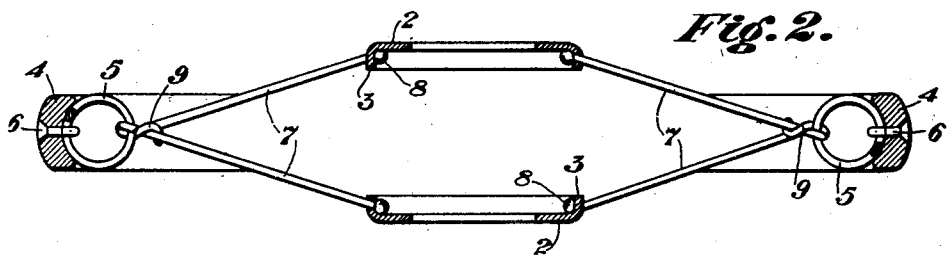
Fig. 2 is a transverse sectional view on the line II, II of Fig. 1.

The object in view is to provide an annular resilient cushioning spring member composed of a continuous spiral spring, so applied and connected as to transmit the various strains to or from the hub member and so connected with an outer tire portion as to permit the use of a solid tire of any suitable construction, whereby to avoid the necessity of the usual pneumatic tire or shoe with its inner tubes.

Referring to the construction illustrated, 2 represents the hub member of any suitable construction, but which may conveniently be made of a single sheet or plate metal disk provided with a wide flange, or of two such disks each having either inwardly or outwardly turned comparatively narrow flanges 3. It will be understood that the disks 2 are centrally perforated and suitably connected with any convenient head or bushing portion adapted for mounting upon an axle spindle, of any of the various commonly used forms, without the necessity of further illustration.

The outer tire 4 may be in the form of a continuous annular shoe of any suitable material adapted to resist wear, and having the necessary degree of flexibility to adapt it to ready use. The main resilient member in such construction consists of a continuous annular spiral spring 5, the coils of which are arranged at any desired distance apart, and of a suitable gage, depending upon the load to be carried, or other condition. The tire member 4 and spring 5 are connected in any suitable manner, as by rivets or clips 6 located at intervals, whereby to fixedly connect these parts in operative position, and the annular spring member 5 is connected directly to flanges 3 of hub 2 by spokes 7. These spokes, as shown, are of the common wire type, and are riveted or otherwise suitably connected with flanges 3, as indicated at 8, and with the inner portions of the spiral strands or loops of spring 5, as indicated at 9. It will be understood that spokes 7 may be arranged in the common tangential method, as indicated, or if preferred, they may be direct from spring 5 toward the center of the hub, and the construction and operation of the invention is not necessarily dependent upon the particular arrangement or connection of the parts shown.

In the construction described, I have embodied an annular resilient spiral spring member intervening between the rigid hub member and the outer tire member, in connection with the series of intervening spokes. The spokes are so arranged and adapted as to transmit the various strains directly from the hub member to the tire member, or vice versa, to allow for considerable amplitude of movement of the spring and for considerable variation of the parts from normal position and return to normal position under the varying conditions of service.

The construction is comparatively simple, inexpensive, not liable to get out of order, capable of easy adjustment or replacement, and avoids the usual objections present with pneumatic tires subject to punctures, blow-outs, etc.

The wheel may be made in various sizes, weights, or otherwise changed or modified in detail construction to suit varying conditions of use or application, but all such changes are to be considered as within the scope of the following claims.

What I claim is:

1. A vehicle wheel having a central hub, an outer tire, a series of spokes, and an annular open coil spiral spring intervening between the hub and tire and directly connected with the spokes by the inner portions of its spiral strands.

2. In combination, a central hub, an outer tire member, a continuous open coil spiral spring member within the tire member, and a series of spokes connecting the hub with the tire through the spiral spring member.

3. In combination, a central hub, an outer tire member, a continuous annular spiral spring member connected with the inner periphery of the tire member, and a series of spokes connecting the spring member with the hub.

4. In combination, a central hub, an outer tire member having an inner concave seat, a continuous annular spiral spring member seated therein and fixedly connected at intervals with the tire member, and a series of spokes directly connecting the spring member with the hub.

In testimony whereof I hereunto affix my signature.

SMITH A. HOGE.